US011301731B2

(12) United States Patent
Ream et al.

(10) Patent No.: US 11,301,731 B2
(45) Date of Patent: Apr. 12, 2022

(54) PROBABILISTIC SAMPLING METHOD FOR TRACK ASSOCIATION

(71) Applicant: Raytheon Company, Waltham, MA (US)

(72) Inventors: Andrew R. Ream, Vail, AZ (US); Timothy E. Caber, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 851 days.

(21) Appl. No.: 16/133,294

(22) Filed: Sep. 17, 2018

(65) Prior Publication Data

US 2020/0090011 A1 Mar. 19, 2020

(51) Int. Cl.
*G06K 9/62* (2006.01)
*G06F 17/16* (2006.01)

(52) U.S. Cl.
CPC .......... *G06K 9/6288* (2013.01); *G06F 17/16* (2013.01)

(58) Field of Classification Search
None
See application file for complete search history.

(56) References Cited

U.S. PATENT DOCUMENTS

| 7,092,924 B1 | 8/2006 | Levedahl | |
| 2016/0314097 A1* | 10/2016 | Bradford | G06F 17/18 |
| 2020/0005489 A1* | 1/2020 | Kroeger | G06K 9/4604 |
| 2021/0221398 A1* | 7/2021 | Korobkin | G06K 9/6288 |

OTHER PUBLICATIONS

James P. Ferry, Exact Bias Removal for the Track-to-Track Association Problem, 12th International Conference on Information Fusion Seattle, WA, USA, Jul. 6-9, 2009, pp. 1642-1649.

(Continued)

*Primary Examiner* — Craig C Dorais
(74) *Attorney, Agent, or Firm* — Schwegman Lundberg & Woessner, P.A.

(57) ABSTRACT

A method for solving the track association problem updates and samples a marginal association likelihood conditioned upon existing track assignments and marginalized over possible sensor biases to assign tracks and build a full association hypothesis. The "sampling" is repeated multiple times for a given seed track pair and for different seed track pairs to quickly generate hypotheses that approximate the solution space. The probabilistic track association includes a plurality of likely full association hypotheses and a soft association matrix that probabilistically reflects the likelihood of the track association for a pair of sensors. Efficacy can be enhanced by sensing and processing non-metric features (e.g. size, shape, color) to supplement the metric features (e.g. location, velocity). Efficiency may be enhanced by prioritizing the list of seed track pairs in order of decreasing likelihood, saving only full association hypotheses that are both unique and close to the current most likely hypothesis and terminating the search based on a staleness criteria. Probabilistic sampling may be used for such diverse applications as missile defense, autonomous vehicles and package handling.

19 Claims, 12 Drawing Sheets

(56) References Cited

OTHER PUBLICATIONS

Kragel et al., Concurrent MAP Data Association and Absolute Bias Estimation with an Arbitrary Number of Sensors, Signal and Data Processing of Small Targets 2008, SPIE Proc. 6969, Paper 6969-50.
Papageorgiou et al., Track-to-Track Association and Ambiguity Management in the Presence of Sensor Bias, Journal of Advances in Information Fusion vol. 6, No. Dec. 2, 2011.
James P. Ferry, Exact Association Probability for Data with Bias and Features, Journal of Advances in Information Fusion vol. 5, No. Jun. 1, 2010.
Mark Levedahl, An Explicit Pattern Matching Assignment Algorithm, Signal and Data Processing of Small Targets 2002, Oliver E. Drummond, Editor, Proceedings of SPIE vol. 4728 (2002).
Fercho et al., Feature-Aided Global Nearest Pattern Matching with Non-Gaussian Feature Measurement Errors, IEEEAC paper #1164, Version 5, Updated Jan. 9, 2009, pp. 1-9.
Danford et al., Joint MAP Bias Estimation and Data Association: Algorithms, Signal and Data Processing of Small Targets 2007, edited by Oliver E. Drummond, Richard D. Teichgraeber, Proc. of SPIE vol. 6699, 66991E.
Stone et al., Track-to-Track Association and Bias Removal, Metron, Inc., 11911 Freedom Drive, Suite 800 Reston, VA 20190, Oct. 31, 2001.
Papageorgiou et al., Simultaneous Track-to-Track Association and Bias Removal Using Multistart Local Search, 2IEEEAC paper# 1142, Version 1, Revision 2, Updated Dec. 11, 2007.

\* cited by examiner

1ST SEED TRACK PAIR, 1ST PASS OF X, 1ST SAMPLING STEP

FIG.6a

HYPOTHESIS, H₁
POSTERIOR
PROBABILITY = .05
$\vec{b}_1 = (1,1,2)$

|  | SENSOR 1 |  |  |
|---|---|---|---|
|  | 1 | 2 | 3 |
| 1 | X |  |  |
| 2 |  |  |  |
| 3 |  | X |  |
| 4 |  |  |  |
| 5 |  |  | X |

SENSOR 2

HYPOTHESIS, H₂
POSTERIOR
PROBABILITY = .1
$\vec{b}_2 = (.9,.9)$

|  | SENSOR 1 |  |  |
|---|---|---|---|
|  | 1 | 2 | 3 |
| 1 | X |  |  |
| 2 |  | X |  |
| 3 |  |  |  |
| 4 |  |  |  |
| 5 |  |  |  |

SENSOR 2

HYPOTHESIS, H₃
POSTERIOR
PROBABILITY = .3
$\vec{b}_3 = (1,1,.5)$

|  | SENSOR 1 |  |  |
|---|---|---|---|
|  | 1 | 2 | 3 |
| 1 |  |  |  |
| 2 |  |  |  |
| 3 |  | X |  |
| 4 | X |  |  |
| 5 |  |  |  |

SENSOR 2

⋮

HYPOTHESIS, Hₙ
POSTERIOR
PROBABILITY = .4
$\vec{b}_n = (1,1)$

|  | SENSOR 1 |  |  |
|---|---|---|---|
|  | 1 | 2 | 3 |
| 1 | X |  |  |
| 2 |  | X |  |
| 3 |  |  |  |
| 4 |  |  |  |
| 5 |  |  | X |

SENSOR 2

FIG.6b

SOFT ASSOCIATION MATRIX, P

|  | SENSOR 1 |  |  |
|---|---|---|---|
|  | 1 | 2 | 3 |
| 1 | .58 | 0 | 0 |
| 2 | 0 | .55 | 0 |
| 3 | 0 | .45 | 0 |
| 4 | .39 | 0 | 0 |
| 5 | 0 | 0 | .55 |

SENSOR 2

PROBABILISTIC SAMPLING METHOD FOR TRACK ASSOCIATION

BACKGROUND OF THE INVENTION

Field of the Invention

This invention relates to methodologies for associating target tracks from multiple sensors to fuse the tracks and enable decision making to act on the targets such as in missile defense, tracking and routing packages and autonomous vehicles.

Description of the Related Art

In order to fuse track state estimates from multiple sensors, an association must first be identified, that is, a mapping of one sensor's reported tracks to another's that are believed to correspond to the same true target objects. As shown in FIG. 1a, Sensor 1 10 and Sensor 2 12 detect and track N moving targets 14. Sensor 1 10 generates m kinematic/metric track state estimates 16 and covariance matrices 18 and Sensor 2 12 generates n track kinematic/metric state estimates 20 and covariance matrices 22 where m<=n<=N. In this discussion, track state estimates and covariance matrices or 'measurements' represent the output of a filtered target tracker/state estimator belonging to each sensor. These estimates have already been corrected for detection and tracking related process noise. [Ferry. *Exact Association Probability for Data with Bias and Features*. Journal of Advances in Information Fusion. Vol 5 No 1 Jun. 2010]. These sensors may be, for example, optical, in the visible, IR or other bands, or electromagnetic, in the RF, millimeter or other bands. In addition to the kinetic/metric track state estimates, the sensors may be configured to provide state estimates of other non-metric features of the targets such as size, shape, color, reflectivity, . . . .

Initial approaches to the track association problem considered only relative distance between reported track states, assigning tracks using a Jonker-Volgenant-Castanon (JVC) or auction algorithm. These approaches ignored sensor bias and thus did not truly perform pattern matching. Track assignments were made on a track-by-track basis without any respect for the relative spacing (sensor bias) between tracks on each sensor (the pattern). In order to perform a pattern match when solving the association problem, sensor bias must be considered [U.S. Pat. No. 7,092,924 and Levedahl. An Explicit Pattern Matching Assignment Algorithm. Signal and Data Processing of Small Targets 2002. SPIE Vol 4728 2002].

Relative sensor bias error complicates the association problem and is only weakly observable, requiring an estimate of sensor bias uncertainty to fully describe an association hypothesis. As shown in FIG. 1b, a sensor 30 generates a track state estimate 32 and a covariance matrix 34 for a target 36. These measurements include a sensor bias shift 38 with a sensor bias covariance matrix 40. For illustrative purposes, this example is shown in two dimensions (e.g., X,Y coordinates). The invention is extensible to n-dimensions. Sensor bias shift represents a misalignment of the measurement axes and sensor location error. It is approximately constant but unobservable or weakly observable (in the presence of measurements over time). Several types of biases exist including sensor measurement error, sensor pointing error and atmospheric effects. Filtering and track state estimation algorithms seek to quantify the uncertainty in a given estimate, which is driven by measurement precision. Sensor platform dependent bias poses a challenge to the association problem because it introduces an interdependence or correlated error between individual track state estimates. The term 'sensor bias covariance matrix' refers to the combination of the individual sensors' reported bias covariance, representing the uncertainty on the relative bias between the two sensors.

Some approaches to solving the track-to-track association problem have shown acceptable results by maximizing the track association likelihood conditioned on a particular bias estimate [Kragel, Danford, & Poore. '*Concurrent MAP Data Association and Absolute Bias Estimation with an Arbitrary Number of Sensors*. Numerica Corporation SPIE Proc 6969 Paper 6969-50. 2008]. Other approaches develop an exact, closed form solution to the joint bias, association likelihood problem which produce properly Bayesian results that do not require conditioning on a particular bias estimate [Ferry. *Exact Bias Removal for the Track-to-Track Association Problem*. $12^{th}$ International Conference on Information Fusion. Seattle, Wa. Jul. 6-9, 2009].

The full solution space for the track association problem can be defined and explored, however the size of the space grows exponentially as number of tracks increase. It quickly becomes computationally prohibitive to explore the full space of association hypotheses, illustrating the need for an efficient algorithm to quickly identify likely hypotheses and approximate the results of the exhaustive approach.

Defined in Levedahl, An Explicit Pattern Matching Assignment Algorithm. Signal and Data Processing of Small Targets 2002. SPIE Vol 4728 2002 2.5, the enumeration of all possible solution hypotheses is calculated by $$n_k = \sum_{k=0}^{m} \binom{m}{k} \frac{n!}{(n-k)!}$$

Where there are m tracks observed by sensor A and n tracks observed by sensor B subject to the restriction m≤n≤N with N representing the number of all true objects detected by either sensor A or sensor B. Any assignment algorithm can make k assignments with 0≤k≤m.

Given infinite time and computational resources, brute-force enumeration of every possible association hypothesis is able to fully define the probability distribution over all hypotheses, and identify the most probable solution. When the number of tracks is large and exhaustive search of the solution space is not computationally feasible, several methods to quickly search the full solution space have been suggested. Interpreting the problem as a Mixed Integer Linear Optimization problem, various branch and bound or branch and cut approaches can be used to identify highly likely solutions in less time than exhaustive search [Papageorgiou, Holender. *Track-to-Track Association and Ambiguity Management in the Presence of Sensor Bias*. Journal of Advances in Information Fusion Vol 6 No 2, December 2011]. The GNPM approach to the problem uses a tree search approach to limit enumeration of unlikely hypotheses by comparison to an arbitrarily defined gate value [Levedahl]. While both approaches are able to quickly identify likely hypotheses, they are unable fully characterize the probability distribution over all association hypotheses in some scenarios due to the bounding or gating of unlikely hypotheses.

Non-exhaustive approaches to the problem seek to improve efficiency by prioritizing the search approach to highly likely regions of the solution space. Methods for defining highly likely regions have been discussed in literature. [Danford, Kragel, Poore. *Joint MAP Bias Estimation and Data Association: Algorithms*. Numerica Corporation, Signal and Data Processing of Small Targets 2007. SPIE Vol 6699] suggests Local Search Heuristics and [Papageorgiou, Sergi. *Simultaneous Track-to-Track Association and Bias Removal Using Multistart Local Search*. IEEEAC paper 1142 Version 1, Revision 2, Updated Dec. 11, 2007] propose random generation of bias hypotheses or FFT Correlation between observed track pairs.

To summarize, there are three known deterministic approaches to solving the track-to-track assignment problem each of which identify the single most likely or "correct" association. The first approach only considers the likelihood of a given association, making track-to-track assignment decisions using a nearest neighbor approach. This approach does not consider the tracks as a 'scene' and does not maintain the pattern of the tracks as reported by the sensors, seeking only to minimize the relative distance between each track independently. The two other approaches frame the assignment problem as a pattern match considering the joint association and bias likelihood, which is necessary to preserve the relative pattern (or common bias) that is present in a reported scene of tracks. A Maximum A Posteriori (MAP) approach describes the joint (Association, Bias) solution, but fails to properly characterize the full distribution. That is to say that the Likelihood of (Association, Bias 1) will not be on the same scale as the Likelihood of (Association, Bias 2) and cannot be compared relative to each other [Papageorgiou, Holender. *Track-to-Track Association and Ambiguity Management in the Presence of Sensor Bias*. Journal of Advances in Information Fusion Vol 6 No 2, December 2011]. The third approach marginalizes the joint space over all biases, allowing for comparison between any association likelihood on consistent scale. Each approach is motivated to quickly and deterministically identify the "correct" track association solution based on the input data. Often, this is computationally prohibitive. In branch and bound and tree search algorithms, unlikely hypotheses are eliminated from the search rapidly, pruning off parts of the total solution space.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention generates a solution for the track association problem that includes a probabilistic track association with a plurality of likely full association hypotheses H in a solution space and a soft association matrix P that probabilistically reflects the likelihood of the association for the tracks observed by Sensors 1 and 2. Each hypothesis includes a posterior probability and a relative bias estimate. Starting from a seed track pair, the approach updates and samples a marginal association likelihood conditioned upon existing track assignments and marginalized over possible sensor biases to assign tracks and build a full association hypotheses. The approach considers different seed track pairs, "sampling" a given seed track pair multiple times (X) to approximate the solution space. The probabilistic sampler is able to quickly generate the hypotheses from the solution space that are most likely.

Efficiency may be enhanced by prioritizing the list of seed track pairs in order of decreasing likelihood of being a valid pair, saving only full association hypotheses that are both unique and have a likelihood within a neighborhood of the current most likely full association hypothesis (e.g., more likely than or within L times the likelihood) and terminating the search based on a staleness criteria (no hypotheses saved in the previous Y seed track pairs). This approach suitably outputs the K most likely full association hypotheses and the soft association matrix based on all of the saved hypotheses. Because the likelihood is marginalized over possible sensor biases, efficiency can be further improved by pre-computing many of the terms required to update the marginal association likelihood. This approach produces a near optimal solution (track association) in far less time than an exhaustive search and provides a probabilistic track association that more accurately reflects the solution space than approaches seeking only the most likely solution.

In an embodiment, the track state estimates for Sensors 1 and 2 are fused using the soft association matrix and the plurality of full association hypotheses. The fused track state estimates are used to make an engagement decision to act on one or more of the N targets. In some cases, only the most likely full association hypothesis is used to generate a single fused track state estimate on which action is taken. In other cases, the soft association matrix is applied to a plurality of the full association hypotheses to generate multiple fused track state estimates on which action is taken.

In an embodiment, each of Sensors 1 and 2 measure kinetic/metric features (e.g., position, velocity, trajectory) to produce the track state estimates. In other embodiments, Sensors 1 and 2 measure non-metric features (e.g., gender, size, color, length, weight) that may be discrete or continuous to produce track state estimates to supplement the metric track state estimates. The marginal association likelihood is updated based on both metric and non-metric features and track state estimates.

In an embodiment, the list of possible seed track pairs is by prioritized in order of decreasing likelihood of being a valid pair. The difference in metric state between any track on sensor 1 and another track on sensor two can be considered as a candidate bias shift, representing an estimate of the relative bias between the two sensors. The prioritization may be a combination of one or more of the following factors: a joint track pair feature compatibility (if non-metric features provided), a relative frequency of track pair bias shift and a track pair bias shift compatibility with the sensor bias covariance matrix.

In different embodiments, the next sampling pass for a given seed track pair may start with a full association hypothesis H including only the seed track pair or the full association hypothesis H generated by the previous sampling pass for the same seed track pair. Re-initializing at each pass with only the seed track pair has the advantage of exploring a wider range of perturbations albeit less likely ones. Using the previous hypothesis has the advantage of incorporating knowledge about track associations and in particular knowledge about unambiguous track associations that can assist to disambiguate other track associations.

In an embodiment, Sensors 1 and 2 are configured (radar, lidar, or optical) to detect and track incoming threats such as enemy missiles. These tracks are passed to a central location like a battle manager or fire control to generate a probabilistic track association, and fuse the tracks to enable fire control to make an engagement decision and launch countermeasures such as missiles to intercept the enemy missiles or to cue more precise tracking of the threats.

In an embodiment, Sensors 1 and 2 are configured (radar, lidar, or optical) and mounted on an autonomous vehicle to make observations of targets in an environment around the autonomous vehicle to provide situational awareness. The fused track state estimates are used to operate the autonomous vehicle to avoid or interact with the targets.

In an embodiment, Sensors 1 and 2 are configured (radar, lidar, or optical) and mounted on a production line to observe packages. The fused track state estimates are used to accept or reject packages and to make routing decisions for the packages.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6*a* and 6*b* are an embodiment of the K most likely full association hypotheses and a soft association matrix, respectively.

DETAILED DESCRIPTION OF THE INVENTION

As previously described, known techniques for track association use a deterministic approach to identify the single most likely association, which is assumed to be correct and forwarded to the fuser to fuse the sensors' track state estimates. These known approaches are unable to characterize the relative amount of uncertainty in the target scene, regardless of the method (MAP, Marginalized) for calculating the cost of assignment.

By contrast, the current technique employs a probabilistic sampling to identify and build a plurality of the likely association hypotheses that approximate the solution space and a soft association matrix. The soft association matrix is a posterior estimate of the full probability density function. This density function communicates information about track pairs in the scene that can be unambiguously associated, and regions of the scene that may be densely populated with true tracks and thus confused. The output of the sampler is useful to communicate that the most likely (or true) association may be only slightly more likely than another assignment hypothesis. The current technique utilizes a marginal cost function to calculate the likelihood of a given hypothesis. This eliminates the burden of calculating new association costs for each posterior bias that is considered. By using a cost function that marginalizes over all possible biases, the sampler builds the candidate association hypothesis iteratively, updating the posterior bias estimate after each track pair is assigned, opposed to building an association using costs that are conditioned on a single bias only. Probabilistic sampling for track-to-track association may be used for such diverse applications as missile defense, autonomous vehicles and package handling.

Figure 1B:
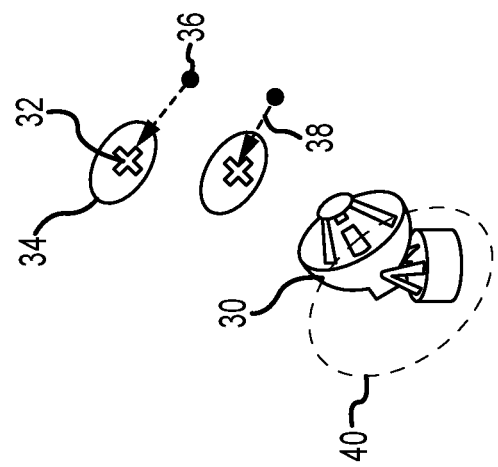
FIGS. 1*a* and 1*b*, as described above, illustrate tracking of multiple targets with multiple sensors and sensor bias.
Figure 1A:
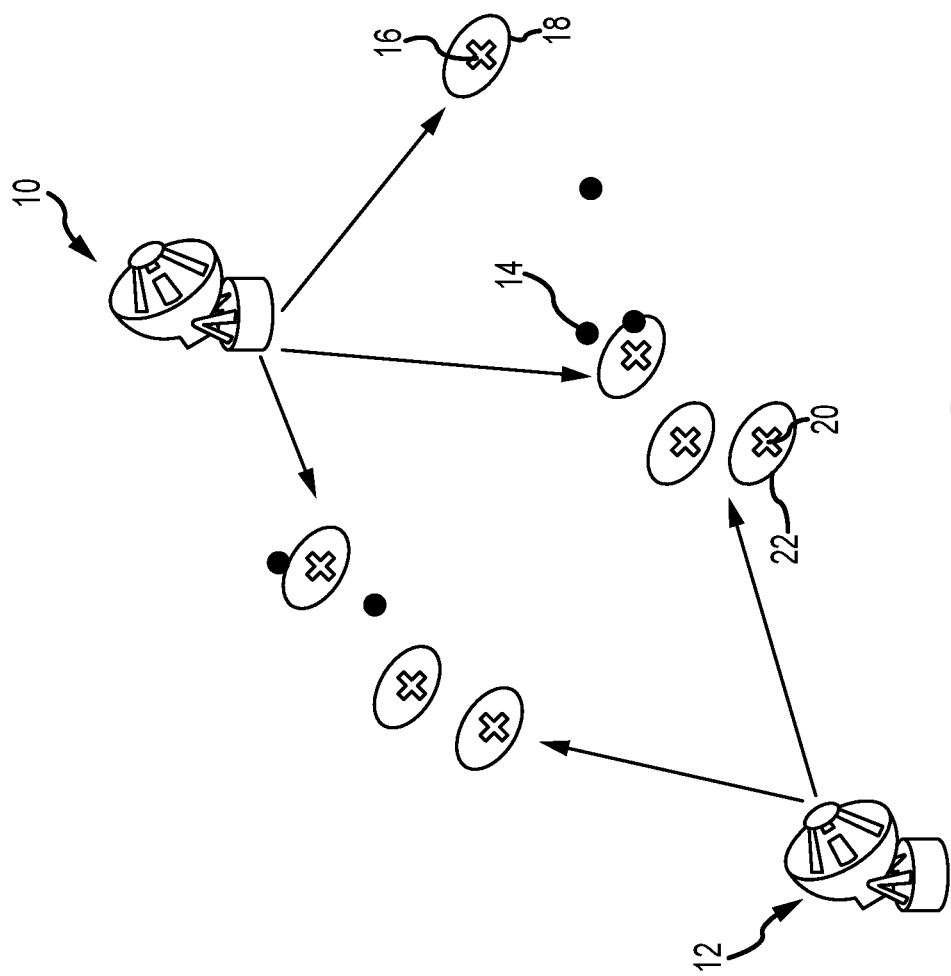
Figure 2:
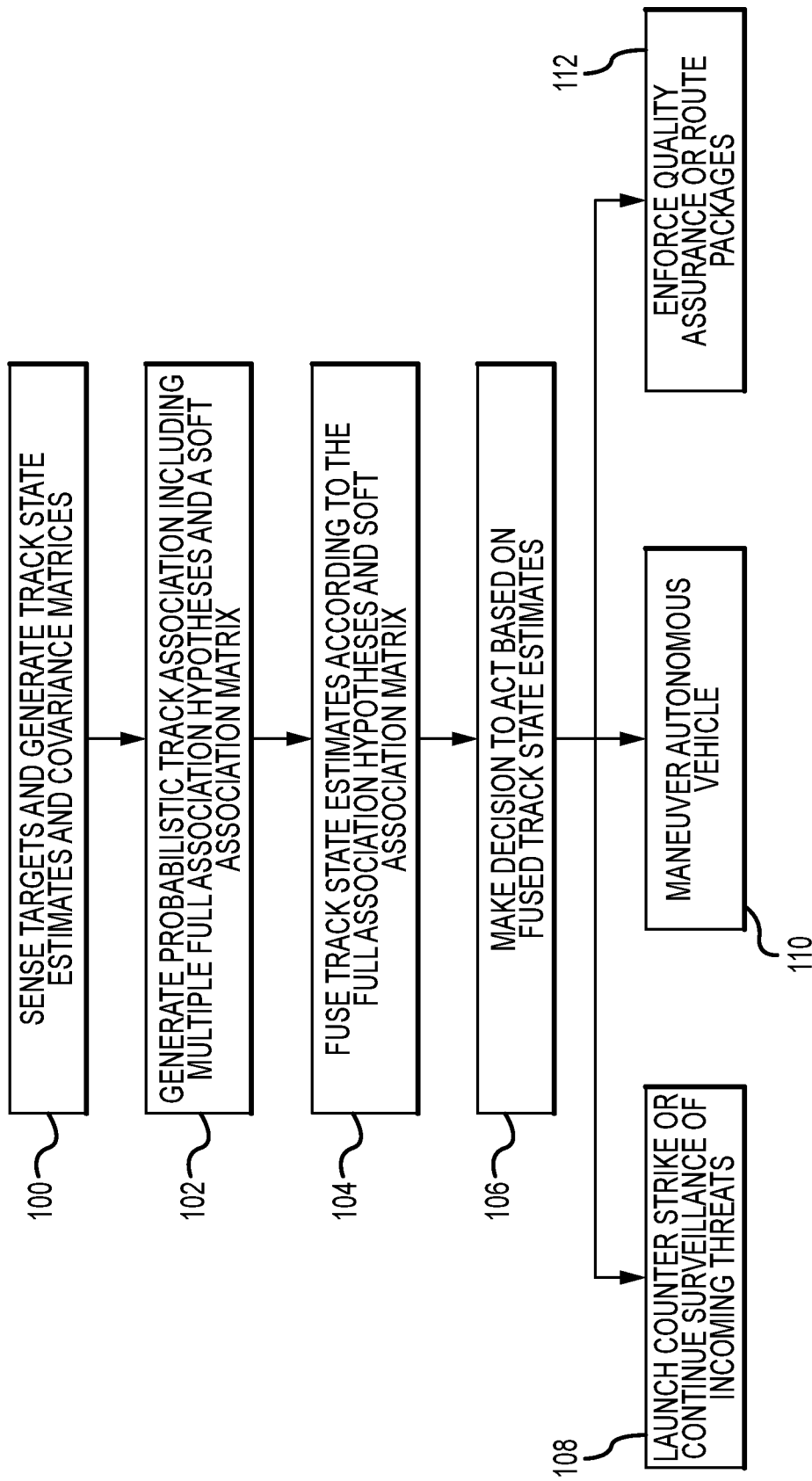
FIG. 2 is a flow diagram of an embodiment in which a probabilistic sampling methodology is used to generate multiple full association hypotheses and a soft association matrix to fuse estimated track states from a pair of sensors.
Figure 3A:
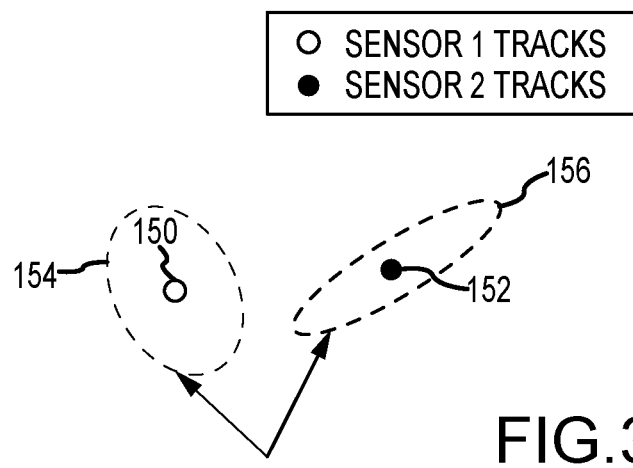
FIGS. 3*a* through 3*c* are exemplary embodiments of metric track inputs and both discrete and continuous non-metric track inputs.
Figure 3B:
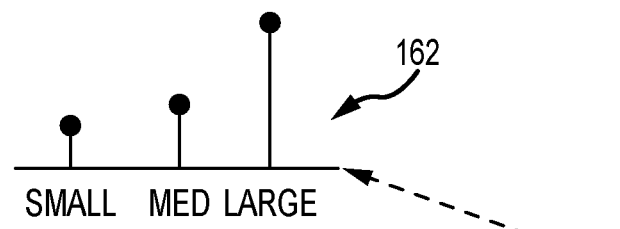
Figure 3B:
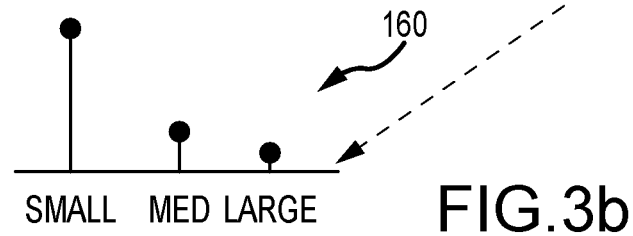
Figure 3C:
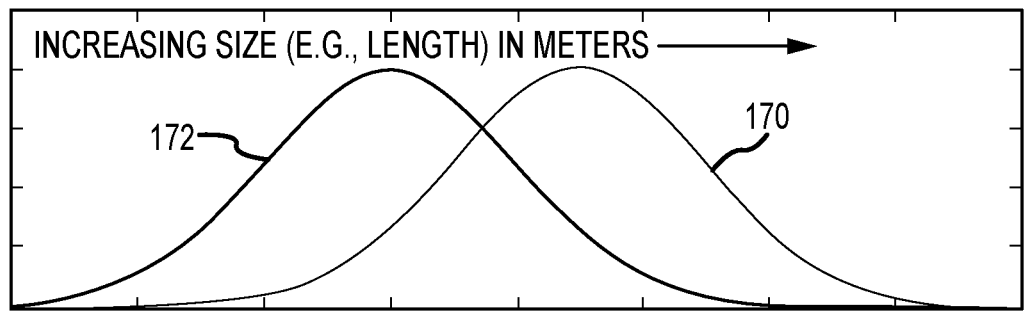

Referring now to FIG. 2, Sensor 1 and Sensor 2 sense a plurality of targets and generate track state estimates and covariance matrices for those states (step 102). $\mathbb{Z}$ is the set of all source track measurements from both sensors and $$\mathbb{Z}_m = \{\vec{x}_{i_m}\}_{i_m=1}^2$$

is the set of all track observations from a sensor m. Given that sensor $m \in \{1,2\}$ reports $nTrks_m$ tracks, the $i^{th}$ reported vector of track measurements from sensor m is represented by $\vec{x}_{i_m}$, $i=1, \ldots, nTrks_m$. $\overline{cov_{I_1}}$, $\overline{cov_{J_2}}$ are the track state covariance matrices for Sensor 1 track i and Sensor 2 track j respectively. As shown in FIG. 3*a*, Sensor 1 and Sensor 2 generate metric (e.g., position, velocity, acceleration) track state estimates 150, 152 and track state covariance matrices 154, 156, respectively. FIG. 3*a* is shown in two-dimensions for illustrative purposes. In addition, Sensors 1 and 2 may generate non-metric (e.g. size, shape, color etc.) track state estimates and covariance matrices. As shown in FIG. 3*b*, Sensors 1 and 2 generate discrete track state estimates 160 and 162 for the size of a target. As shown in FIG. 3*c*, Sensors 1 and 2 generate continuous track state estimates 170 and 172 for the size of a target.

A computer-implemented probabilistic sampler processes the track state estimates and covariance matrices to generate a probabilistic track association including multiple full association hypotheses H and a soft association matrix P (step 102). Each hypothesis in H represents a track-to-track assignment of the m track state estimates from Sensor 1 to the n track state estimates from Sensor 2 for the N actual targets. Each hypothesis includes a posterior probability and a relative bias estimate. The plurality of hypotheses saved and output are the ones with the highest likelihood of being a correct assignment. The soft association matrix P probabilistically reflects the likelihood of a particular combination of track assignments out of the set of all possible track assignments for Sensors 1 and 2.

The probabilistic sampler "samples" a marginal association likelihood L conditioned upon existing track assignments and marginalized over possible biases to iteratively build each hypothesis. Rather than weight each association likelihood by the individual and unique bias likelihood, this approach integrates this joint likelihood over all possible biases for a correct Bayesian formulation of the association likelihood where b is relative sensor bias:

$$\int_{b \in \mathbb{R}} DL(H,b \mid \mathbb{Z})db = L(H \mid \mathbb{Z}) \qquad (1)$$

This approach provides the ability to evaluate track-to-track association likelihood independent of sensor biases, by marginalizing over the bias hypothesis space. This method gives the benefit of evaluating relative track-to-track pairing likelihood, independent of bias hypothesis, allowing the user to probabilistically reason on scene information and assess relative track ambiguity A computer-implemented fuser fuses the track state estimates from Sensors 1 and 2 according to the full association hypothesis H and a soft association matrix P (step 104). In certain applications, the fuser uses only the most likely full association hypothesis to fuse the track state estimates. In other applications, the fuser uses a plurality of the full association hypotheses (all or less than all) and the soft association matrix to generate a plurality of fusion hypotheses. Evaluating the plurality of the identified solution hypotheses, or a summary statistic thereof, allows the end user to reason on different sub-regions within the scene. For example, in the event that one region of the scene contains many closely spaced truth objects, which creates ambiguity in the track to track assignment, the soft association matrix would reflect the uncertainty by approaching values of 1/n where n is the number of tracks reported by the other sensor in that particular region. In this same example there may be tracks in other regions of the scene that are unambiguously associated, in other words, no matter what the association hypothesis assigns in the confused regions, these particular tracks are always assigned, representing near certainty in this sub region. It is not possible to ascertain this information from evaluation of only the most-likely hypothesis returned by a track assignment algorithm, a plurality of solutions must be considered jointly to determine if there are many equally likely association hypotheses, and thus a confused region in the scene.

A computer-implemented decision engine acts on the fused track state estimates (or multiple hypotheses of fused track state estimates) and acts on the targets (step 106).

In an embodiment, Sensors 1 and 2 are configured (radar, lidar, or optical e.g., visible or IR band) to detect and track incoming threats such as enemy missiles, generate a probabilistic track association, and fuse the tracks to enable fire control to make an engagement decision and launch countermeasures such as missiles to intercept the enemy missiles or to cue more precise tracking of the threats.

In an embodiment, Sensors 1 and 2 are configured (radar, lidar, or optical) and mounted on an autonomous vehicle to make observations of targets in an environment around the autonomous vehicle to provide situational awareness. The fused track state estimates are used to operate the autonomous vehicle to avoid or interact with the targets.

In an embodiment, Sensors 1 and 2 are configured (radar, lidar, or optical) and mounted on a production line to observe products. The fused track state estimates are used to accept or reject packages and to make routing decisions for the products.

Figure 4:
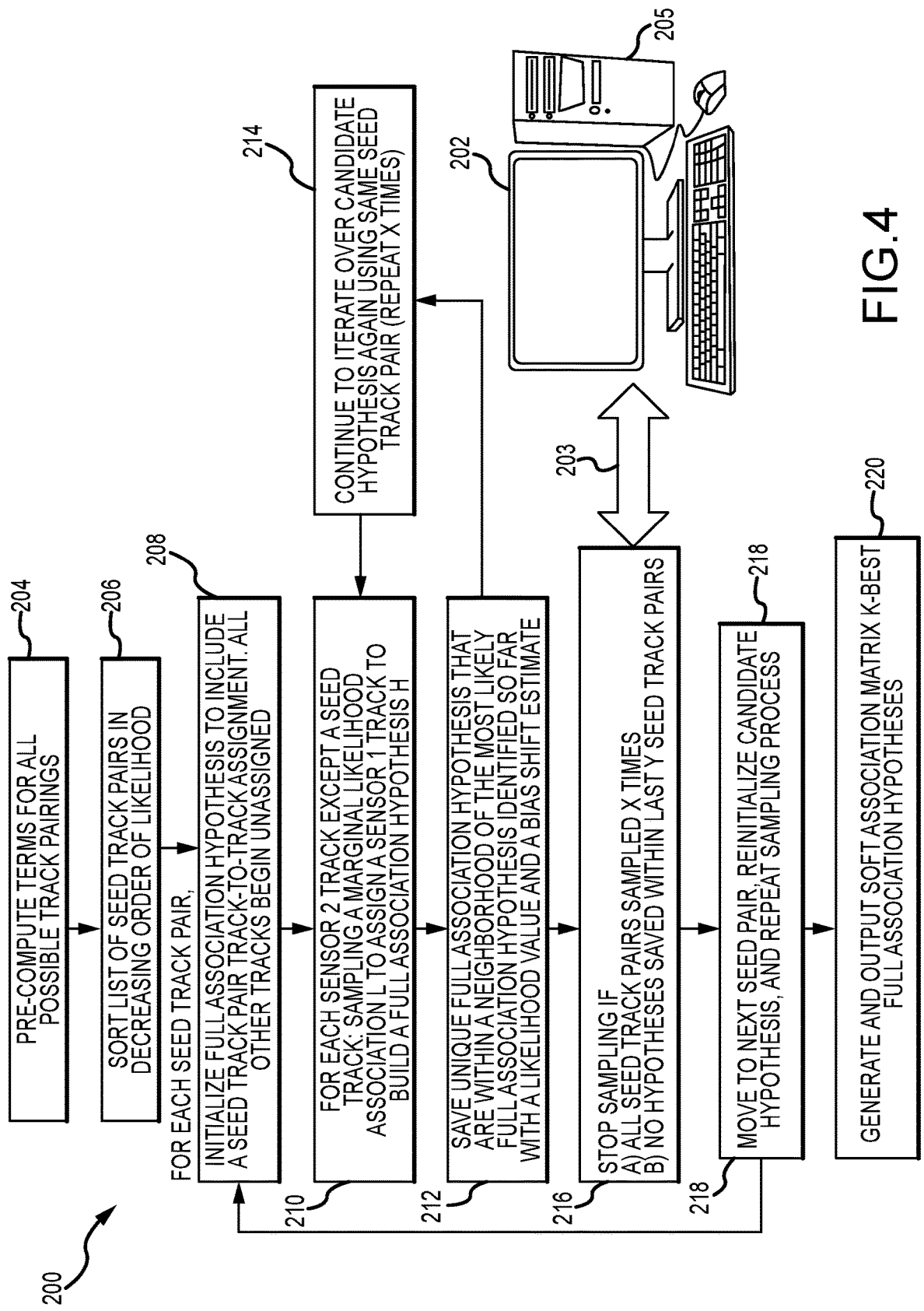
FIG. 4 is a flow diagram of a computer-implemented embodiment of the probabilistic sampler.

Referring now to FIG. 4, an embodiment of a probabilistic sampling method 200 for generating a probabilistic track association (hypotheses H and a soft association matrix P) is implemented on a computer 202. Instructions stored in computer memory 205 are executed by the computer 202 to form a "probabilistic sampler" 203.

Because the marginal association likelihood L is marginalized over possible biases b, the probabilistic sampler can pre-compute a number of terms for all possible track pairings (step 204), which greatly improves overall computational efficiency. For each (i,j) track pair of the n*m possible pairs associating a track i from Sensor 1 with a track j from Sensor 2, the probabilistic sampler pre-computes and saves:

a delta track state estimate $x_{i,j} = \widehat{x_{i1}} - \widehat{x_{j2}}$, where $\widehat{x_{l_m}}$ is the lth track state estimate from the mth sensor, (2)
a joint covariance matrix $S_{i,j} = \overline{cov_{i_1}} + \overline{cov_{j_2}}$, where $\overline{cov_{l_m}}$ is the lth track state covariance matrix from the mth sensor, (3)
an inverse joint covariance matrix $S_{i,j}^{-1}$, (4)
a determinant of the joint covariance matrix $|S_{i,j}|$, (5)
a Mahalanobis distance $x_{i,j}^T S_{i,j}^{-1} x_{i,j}$, (6) and
a covariance weighted track state $S_{i,j}^{-1} x_{i,j}$, (7).

The probabilistic sampler sorts a list of seed track pairs in decreasing order of likelihood of being a valid pair (step 206). Each seed track pair represents the mapping of a particular track i from sensor 1 with a particular track j from sensor 2 (e.g. 1-1, 2-2, 1-3, 2-4 etc.). The difference in metric state between these tracks (equation 2) is used as a candidate bias shift, providing an estimate of the relative bias between sensor 1 and sensor 2. It is noted that this estimate includes the per track random error in addition to the relative sensor biases. The likelihood of a particular track pair being a part of the correct full track association may be calculated based on one or more factors including but not limited to: a joint track pair feature compatibility, a relative frequency of track pair bias shift and a track pair bias shift compatibility with the sensor bias covariance matrix. The joint track pair feature compatibility assumes the existence of non-metric features and is a measure of likeness in the non-metric space (e.g. tracks that both sensors report as 'blue' would be more likely to emanate from the same true object than a 'blue' track and a 'red' track). Other factors are based on metric features. The relative frequency of track pair bias shift captures relative compatibility of each bias shift, compared to all candidate bias shifts in the scene. If the bias that comes from a seed track pairing is similar to many other biases that are observed in the scene, the priority weight is higher than a bias that only occurs one time. The track pair bias shift compatibility with the sensor bias covariance matrix represents the compatibility of each bias candidate with the bias covariance, which is assumed to be normally distributed with zero mean. A candidate bias that is much smaller than the bias covariance is prioritized higher than a bias shift that is many times larger than the bias covariance. If multiple factors are considered, the individual factor values are multiplied together to provide the weight or likelihood for a particular seed track pair. Literature has shown that non-kinematic features can be included into either the MAP or Marginal cost functions [Fercho, Papageorgiou. *Feature-Aided Global Nearest Pattern Matching with Non-Gaussian Feature Measurement Errors.* IEEEAC paper 1164 Version 5, Updated Jan. 9, 2009][Ferry. *Exact Association Probability for Data with Bias and Features.* Journal of Advances in Information Fusion. Vol 5 No 1 Jun. 2010],[Levedahl. An Explicit Pattern Matching Assignment Algorithm. Signal and Data Processing of Small Targets 2002. SPIE Vol 4728 2002][Stone, Williams, Tran. *Track-to-Track Association and Bias Removal.* Metron, Inc. 31 Oct. 2001]. When provided as input from the sensors, this invention adopts and extends to use the non-metric features in bias prioritization explained above.

The probabilistic sampler utilizes a Monte Carlo technique known as importance sampling. Starting with the most likely seed track pair, the sampler creates a candidate hypothesis containing that seed track pair leaving all other tracks unassigned (step 208). For each Sensor 2 track (except an assigned seed track), the probabilistic sampler updates the marginal likelihood association L (including the null-assignment) based on updated track assignments and samples (draws) a Sensor 1 track from the marginal likelihood association L to assign another track pair to iteratively build a full association hypothesis H (step 210). The assignment may be to the null track (i.e., some tracks may be left unassigned). The calculation of L is based at least on metric information and possibly non-metric information. A benefit of the marginal association likelihood equation is that the likelihood of a given track pairing, conditioned on other track pairs currently in the hypothesis, becomes higher for track-pairs that have bias shifts similar to those currently included in the candidate hypothesis. The probabilistic sampler loops over each Sensor 2 track, updating the marginal likelihood association L with each iteration, until each Sensor 2 track has been sampled X times.

The probabilistic sampler uses $H^0=\{x_{0,0}=0, S_{0,0}=R\}$ to represent the zero-mean Gaussian relative sensor bias. Then, including the null-association hypothesis (all tracks unassigned) as $H^+=H\cup\{H^0\}$ and integrating over all possible biases (eq 1) the probability of the association hypothesis is represented as $P_M$ (Papageorgiou & Holender, 2011). The subscript M is used here to indicate that the form of equation 8 is based only on metric information.

$$L_M(H\mid \mathbb{Z}) = (\beta_{NT1}\beta_{NT2})^{I^0}(\beta_T P_{12})^I * \frac{\sqrt{2\pi^2|V|}}{\sqrt{\prod_{i,j\in H^+} 2\pi^2|S_{i,j}|}} e^{-\frac{\zeta}{2}} \quad (8)$$

$$V = \left(\sum_{i,j\in H^+} S_{i,j}^{-1}\right)^{-1} \quad (9)$$

$$\zeta = \left(\sum_{i,j\in H^+} x_{i,j}^T S_{i,j}^{-1} x_{i,j}\right) - u^T V u \quad (10)$$

$$u = \sum_{i,j\in H^+} S_{i,j}^{-1} x_{i,j} \quad (11)$$

Where I represents the cardinality of the assigned (i,j) track pairs within the hypothesis H, and $I^0$ represents the cardinality of the unassigned tracks in the form of (i,0) or (0,j).

The V, $\zeta$ and u are just intermediate terms for purposes of calculation.

For a given region of interest at a given time with track observations from Sensor 1 and track observations from Sensor 2, the variables above, represent:

R=[D, D] bias covariance matrix, where D is the number of dimensions of the metric state information provided by the sensors $\beta_{NT1}=\beta_T P_{T2}+\beta_{FA2}$=false target density for sensor 2
$\beta_{NT2}=\beta_T P_{T2}+\beta_{FA1}$=false target density for sensor 1
$P_{T2}=(1-P_1)P_2$ Represents probability of not detecting a track on sensor 1 while detecting it on Sensor 2, estimated empirically based on sensor characteristics
$P_{12}=P_1(1-P_2)$ Represents probability of not detecting a track on sensor 2 while detecting it on Sensor 1, estimated empirically based on sensor characteristics
$\beta_{FA1}$, $\beta_{FA2}$ Represent the false track densities for sensor 1 and 2, respectively, estimated empirically based on sensor characteristics
$\beta_T$=target density per the n-dimensional state space volume, $$\frac{\hat{\eta}}{V},$$

includes non-metric features, if reported

If the sensors provide track state estimates based on non-metric features the marginal likelihood function L includes a feature weight term:

$$L(H\mid \mathbb{Z}) = \prod_{(i,0)\in H} \beta_{NT2} \prod_{(0,j)\in H} \beta_{NT1} * \quad (12)$$

-continued $$\prod_{(i,j)\in H} \beta_T P_{12} \frac{\sqrt{2\pi^2|V|}}{\sqrt{\prod_{i,j\in H^+} 2\pi^2|S_{i,j}|}} e^{-\frac{\zeta}{2}} \prod_{(i,j)\in H} featureWeight_{i,j}$$

where featureWeight$_{i,j}$=Combined feature weight for association ij. The specific calculation for this term varies for discrete vs. continuous non-metric feature measurements, but in both cases represents a probability overlap measure that describes the compatibility between the $i^{th}$ and $j^{th}$ feature measurements reported by each sensor.

The probability of association in (eq 12) considers additional information over metric-only association approaches such as eq. 8. featureWeight$_{i,j}$ Information adds dimension to the space used to compare the likelihood of one (i,j) pairing to another. Conflicting feature measurements between observations i and j penalize that particular track-to-track association likelihood, with the adjustment to $\beta_T$ serving to normalize an ignorance representation from any non-informative (or unobserved) track feature.

After sampling each Sensor 2 track, the sampler evaluates the resulting Full Association Hypothesis H for uniqueness (i.e. has the sampler identified this hypothesis on a previous iteration?). In addition to uniqueness, the sampler requires that the likelihood of any unique hypothesis be more likely than, or within L times of, the most likely hypothesis identified so far to be saved (step 212). The null-assignment (all tracks unassigned) hypothesis score is used as the initialization value for the most likely hypothesis score. Smaller values of L retain fewer of the lower likelihood hypotheses, resulting in less memory usage, at the expense of a reduction in accuracy of the approximation of the full solution space. If the current association hypothesis meets the above checks, it is saved in memory with the corresponding likelihood value for later use.

Steps 208, 210 and 212 are repeated X times for the same seed track pair to generate one or more different full association hypotheses H (step 214). For a given scene there are (m*n) possible seed pairs, and at most (m*n)*X total hypotheses could be generated from the sampler. Larger values of X approach the exhaustive assignment result, at the expense of run time and memory. Smaller values of X can be used to control run time and the accuracy of the approximation returned by the algorithm. It is possible to set the value of X based on some scene dependent parameters such as number of tracks, or track density.

The probabilistic sampler exits if all of the seed track pairs on the list have been sampled X times or upon satisfaction of a "staleness" criteria e.g. no full association hypotheses have been saved in the last Y seed track pairs (step 216). If neither criteria is satisfied, the probabilistic sampler moves to the next seed track pair on the list, re-initializes a full association hypothesis H and repeats the sampling process of steps 210, 212 and 214 to save unique and sufficiently likely hypotheses H (step 218).

Once the exit criteria is met in step 216, the probabilistic sampler generates an output including a plurality of likely full association hypotheses H and a soft association matrix P (step 220). In an embodiment, the algorithm can return the top-K full association hypotheses identified by the sampler in order of decreasing likelihood to facilitate multiple hypothesis tracking and fusion or scene ambiguity assessment. In the event that K exceeds the total number of unique hypotheses identified, the algorithm returns all of the unique hypotheses that have been identified in order of decreasing likelihood.

A relative bias estimate ($\widehat{b_k}$) is calculated for each of the K returned hypotheses as a posterior, given the input sensor bias covariance and the track pairs included in the association hypothesis ($H_k^+$), using the terms defined in (9) and (11) previously.

$$\widehat{b_k} = V_{H_k^+} * u_{H_k^+} \qquad (13)$$

The soft association matrix P is dimensioned m by n with each (i,j) representing the probability that track i from Sensor 1 is paired with track j from Sensor 2. The soft association matrix can be thought of as an approximation of the true probability distribution over all possible association hypotheses, estimated from the likelihood of all the association hypotheses identified and saved by the sampler (equations 8-12). The purpose of the sampler is to approximate the distribution of all possible track-to-track assignments without explicitly enumerating each one. By normalizing the likelihoods of all unique association hypotheses identified and saved by the sampler, the posterior probability for each hypothesis is calculated. This information can be used to inform decisions regarding some or all track pairs such as data fusion and scene quality assessment.

Referring now to FIGS. 5a-5f and 6a-6b, an embodiment of the iterative updating and sampling of the marginal association likelihood L to build, save and output a plurality of the K most likely full association hypotheses H that approximate the solution space and a soft association matrix is illustrated for a two-dimensional example. In this example, there are N=5 true targets in target scene 300, Sensor 1 detects and generates track state estimates for m=3 targets and Sensor 2 detects and generates track state estimates for n=5 targets.

Figure 5A:
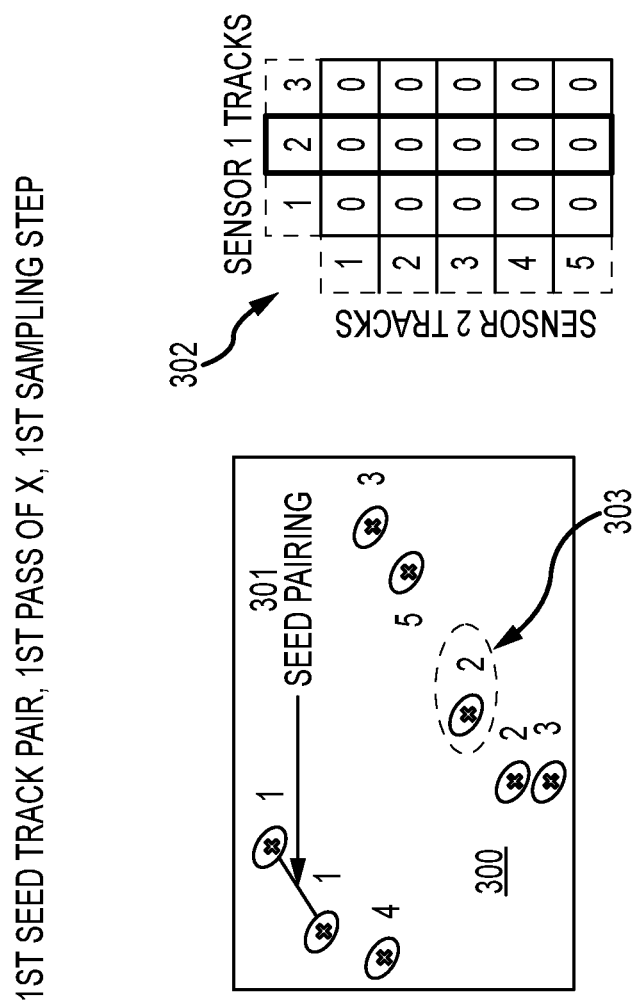
FIGS. 5*a* through 5*g* illustrate an embodiment of the probabilistic sampling methodology to build and save a plurality of likely full association hypotheses for a solution space.
Figure 5A:
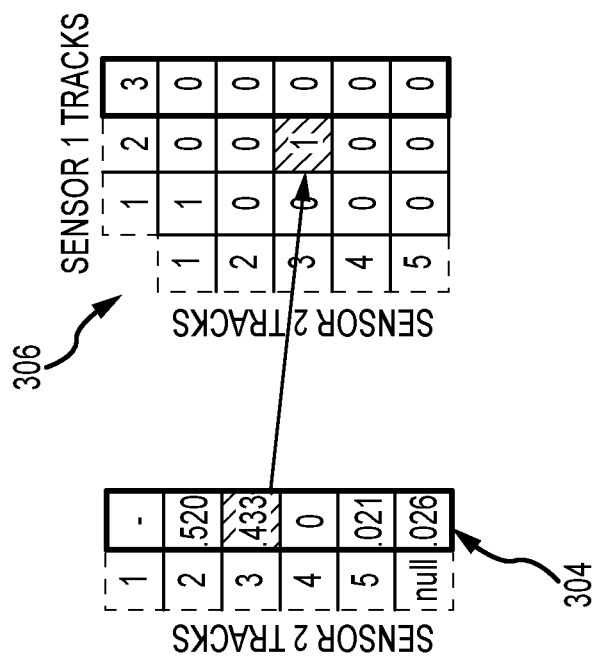

FIG. 5a illustrates a 1$^{st}$ sampling step of a 1$^{st}$ of X passes of a 1$^{st}$ seed track pair of (1,1) 301. The probabilistic sampler initializes a full association hypothesis H 302 with the seed track pair (1,1). In the 1$^{st}$ sampling step, the sampler must assign Sensor 1 track 2 303 to an available track in Sensor 2. The sampler updates the marginal association likelihood L 304 of pair Sensor 1 track 2, which shows that Sensor 2 track 1 (part of the seed pair) is unavailable, tracks 2 and 3, which are close to Sensor 1 track 2 and close to each other, have a likelihood of 0.520 and 0.433, respectively, track 4, which is not close, has a likelihood of 0.0, track 5, which is fairly close but closer to Sensor 1, track 3, has a likelihood of 0.021, and the null assignment has a likelihood of 0.026. The sampler performs a weighted random draw (weighted by the marginal association likelihoods L 304) to select a Sensor 2 track to pair with Sensor 1, track 2. In this case, the sampler draws Sensor 2, track 3 to assign track pair (2,3) 306. Note, the sampler did not in this case draw the most likely track pairing. This is the essence of the probabilistic sampler to create a plurality of association hypotheses that approximate the solution space and to do so efficiently.

Figure 5B:
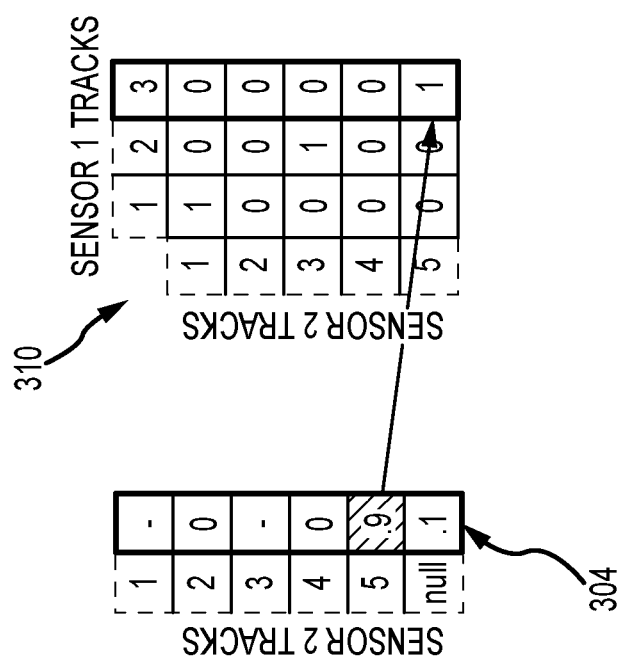

FIG. 5b illustrates a 2nd sampling step of a 1$^{st}$ of X passes of the 1$^{st}$ seed track pair of (1,1) 301. In the 1$^{st}$ sampling step, the sampler must assign Sensor 1 track 3 308 to an available track in Sensor 2 to iteratively build full association hypothesis H 302. The sampler updates the marginal association likelihood L 304 of pair Sensor 1 track 3, which shows that Sensor 2 tracks 1 and 3 (previously assigned) is unavailable, tracks 2 and 4 have zero likelihood, track 5, which is close to Sensor 1 track 3, has a likelihood of 0.9, and the null track has a likelihood of 0.1. The sampler performs a weighted random draw (weighted by the marginal association likelihood L 304) to select a Sensor 2 track to pair with Sensor 1, track 3. In this case, the sampler draws Sensor 2, track 5 to assign track pair (3,5) 310.

Figure 5C:
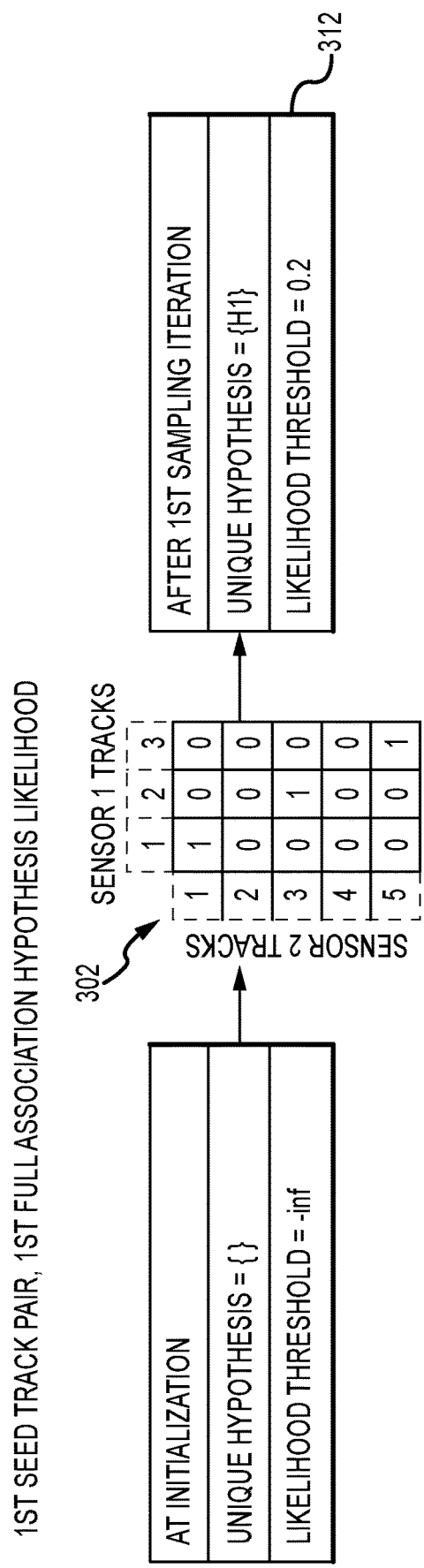

FIG. 5c illustrates a first complete full association hypothesis H 302 and the computation of its likelihood. At initialization, each Sensor 1 track is suitably assigned to the null track and threshold is set at negative infinity. The likelihoods are calculated in "log space", and the log likelihood of hypothesis H 302 for the particular track assignments is 0.2. The first hypothesis is always saved and the likelihood threshold is updated to its log-likelihood value of 0.2, 312. Thereafter, each subsequent candidate hypothesis is tested to determine whether it is either more likely than or within a defined neighborhood of the most likely full association hypothesis H identified so far. Whether the candidate hypothesis is within the neighborhood may be determined by whether its likelihood is within L times the likelihood of the most likely hypothesis H. In log space, L times is an offset of log(L).

Figure 5D:
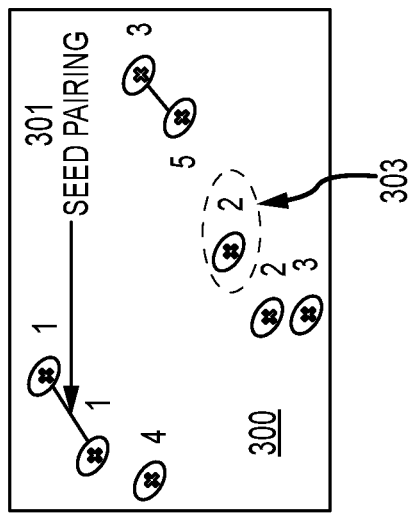

FIG. 5d illustrates a 1$^{st}$ sampling step of a 2nd of X passes of the 1$^{st}$ seed track pair of (1,1) 301. In this implementation, the probabilistic sampler starts with the full association hypothesis H 302 from the previous pass with the seed track pair (1,1). Alternately, the sampler could start with a full association hypothesis H including only the seed track pair for each of the X passes. The sampler skips the seed track and writes over the other tracks. Importantly, those previous track assignments affect the marginal association likelihood L 304. In the 1$^{st}$ sampling step, the sampler must assign Sensor 1 track 2 303 to an available track in Sensor 2. The sampler updates the marginal association likelihood L 304 of pair Sensor 1 track 2, which shows that Sensor 2 track 1 (part of the seed pair) and Sensor 2 track 5 (assigned) are unavailable, tracks 2 and 3, which are close to Sensor 1 track 2 and close to each other, have a likelihood of 0.68 and 0.3, respectively, track 4, which is not close, has a likelihood of 0.0, and the null track has a likelihood of 0.02. The sampler performs a weighted random draw (weighted by the marginal association likelihood L 304) to select a Sensor 2 track to pair with Sensor 1, track 2. In this case, the sampler draws Sensor 2, track 2 to create track pair (2,2) 314.

A possible advantage of continuing subsequent sampling steps for a given seed track using the association hypothesis from the previous step is that the sampler can generate and refine solution hypotheses that are conditioned on all the information provided as input from the sensors. In particular, the sampler can use knowledge about unambiguous track associations to disambiguate other track associations. For example, in the situation in which one region of the scene has many closely spaced true targets, and is thus confused, the sampler may be forced to make an assignment between two tracks that have near equal likelihood, e.g., 0.501.50 probability. After the sampler completes the first pass over all sensor 2 tracks, it will have had the opportunity to evaluate any non-confused (unambiguous) areas within the scene, which will incorporate very highly likely track assignments into the candidate hypothesis. On subsequent sampling iterations, the marginal association likelihood cost for track pairs within a confused region will be updated based on the current hypothesis, which now contains one or multiple unambiguously associated track pairings. In the presence of additional track associations, the marginal association likelihood function for track assignments with many likely pairs will prioritize track pairings, which have a bias shift that is compatible with the entire scene (or association hypothesis). In other words, in the event that a track pairing is initially confused between equally likely track pairings that suggest a bias shift of equal magnitude 'up' or 'down', the sampler will make an assignment in proportion to their likelihood, which may be a 0.50/0.50 shot. If, after considering the rest of the scene, the sampler has made one or multiple highly likely (unambiguous) assignments in other regions that hypothesize a bias shift of 'down', when the sampler returns to the confused region, the marginal cost of the track assignments will now show that the track pairing that reflects a bias shift of 'down' is more likely than the previously equally likely track pairing that reflects a bias shift of 'up'.

A possible advantage of re-initializing the full association hypothesis for each sampling iteration for a given seed track pair with only the seed track pair is exploring a wider range of perturbations albeit less likely. In general the sampler may generate more 'random' results in very ambiguous situations, as different associations made early in the sampling process can result in different candidate hypotheses at the conclusion of the iteration.

Figure 5E:
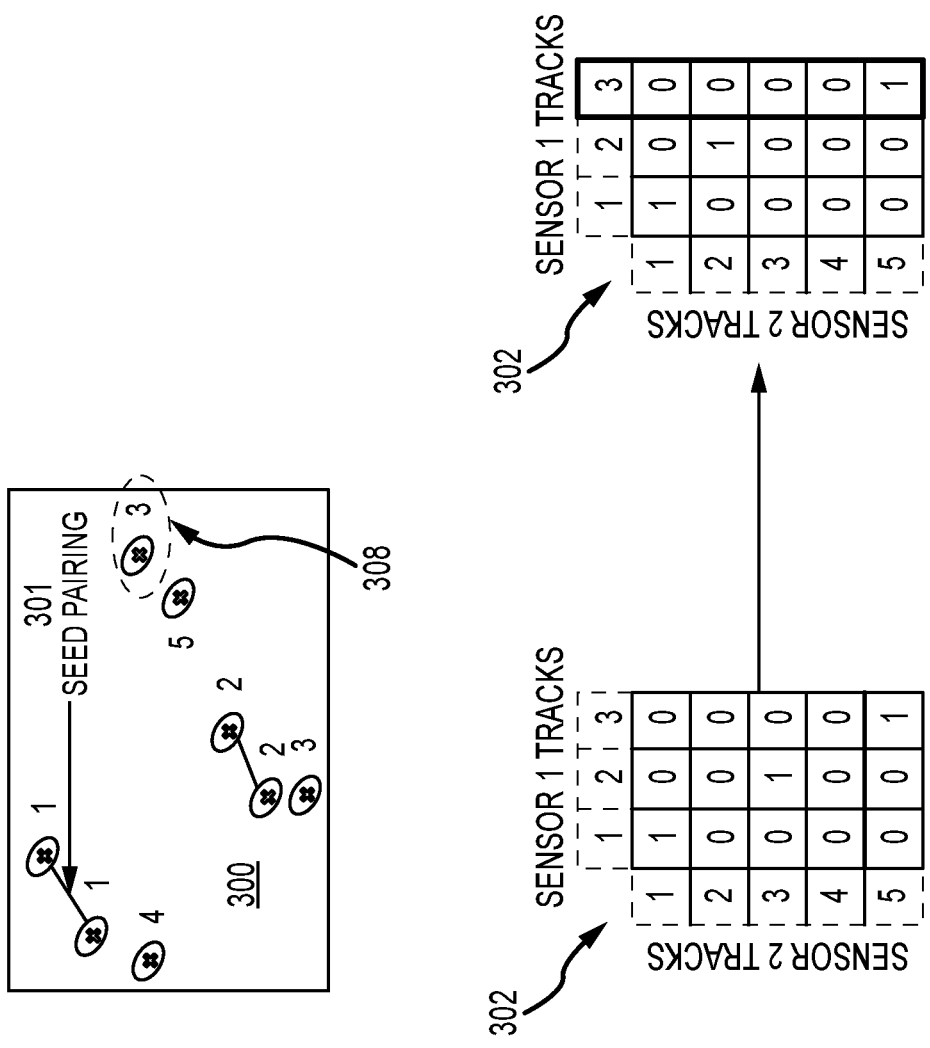

FIG. 5e illustrates a 2nd sampling step of a 2nd of X passes of the $1^{st}$ seed track pair of (1,1) 301. In the $1^{st}$ sampling step, the sampler must assign Sensor 1 track 3 308 to an available track in Sensor 2 to iteratively build full association hypothesis H 302. The sampler updates the marginal association likelihood L 304 of pair Sensor 1 track 3, which shows that Sensor 2 tracks 1 and 2 (previously assigned) are unavailable, tracks 3 and 4 have zero likelihood, track 5, which is close to Sensor 1 track 3, has a likelihood of 0.9, and the null track has a likelihood of 0.1. The sampler performs a weighted random draw (weighted by the marginal association likelihood L 304) to select a Sensor 2 track to pair with Sensor 1, track 3. In this case, the sampler draws Sensor 2, null track 316 to leave Sensor 1, track 3 unpaired. This draw is far less likely than Sensor 2 track 5 but again part of the randomness of the probabilistic sampler that builds hypotheses that approximate the solution space.

Figure 5F:
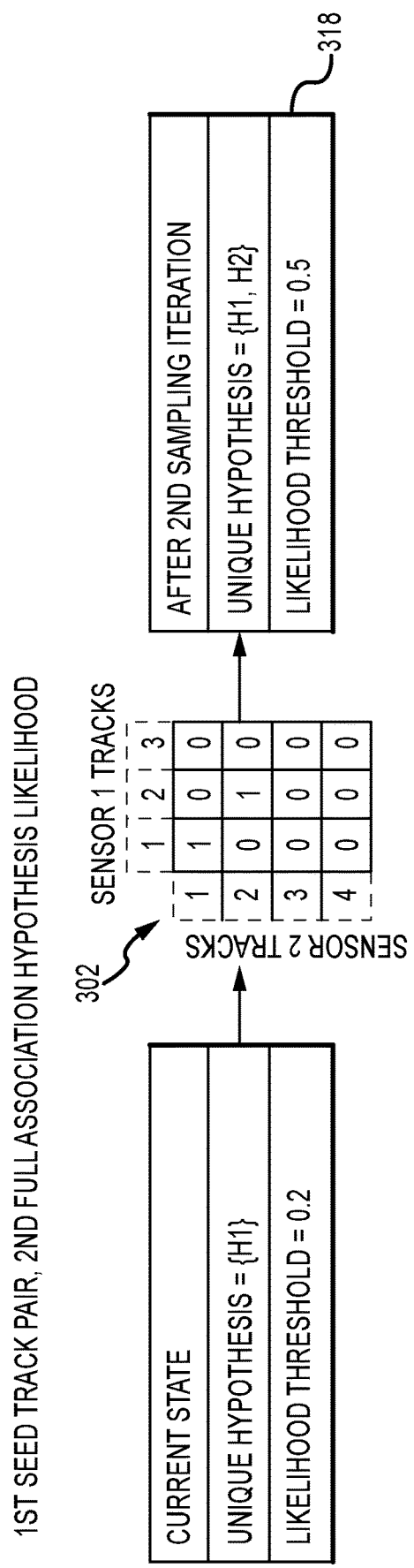

FIG. 5f illustrates a second complete full association hypothesis H 302 and the computation of its likelihood threshold 318. In the previous iteration, the log likelihood threshold was set at 0.2 for the most likely full association hypothesis H to date. The second full association hypothesis has a log likelihood of 0.5, which is more likely than 0.2. The probabilistic sampler updates the likelihood threshold and saves the full association hypothesis.

Figure 5G:
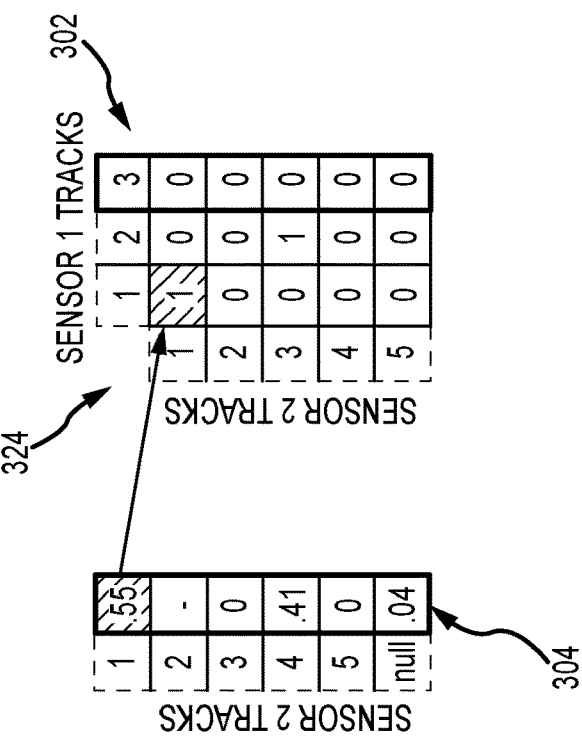
Figure 5G:
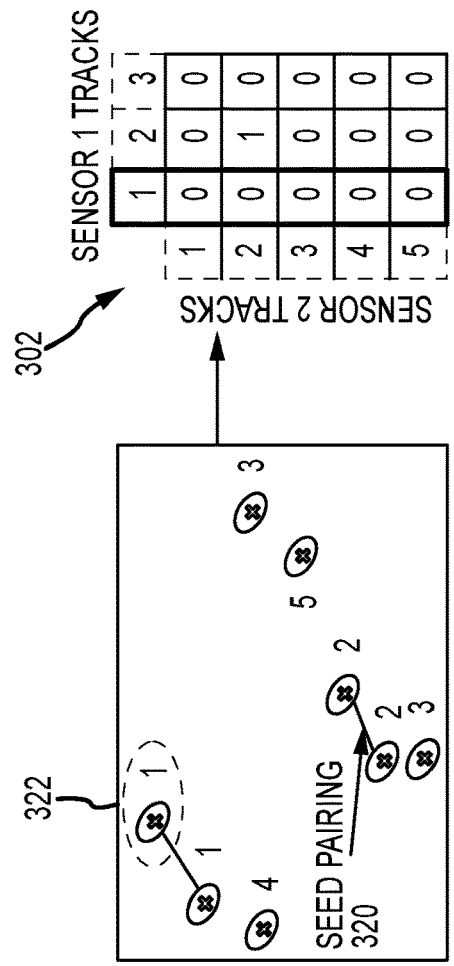

FIG. 5g illustrates a $1^{st}$ sampling step of a $1^{st}$ of X passes of a $2^{nd}$ seed track pair of (2,2) 320. The probabilistic sampler initializes a full association hypothesis H 302 with the seed track pair (2,2). In the $1^{st}$ sampling step, the sampler must assign Sensor 1 track 1 322 to an available track in Sensor 2. The sampler updates the marginal association likelihood L 304 of Sensor 1 track 1, which shows that Sensor 2 track 1 has a likelihood of 0.55, track 2 (part of the seed pair) is unavailable, tracks 3 and 5 have a likelihood of 0.0, track 4 has a likelihood of 0.41 and the null track has a likelihood of 0.4. The sampler draws Sensor 2 track 1 to pair with sensor 1 track 1 to form track pair (1,1) 324 to build the full association hypothesis 302. The probabilistic sampler skips Sensor 1 track 2 as it is part of the seed pair and repeats the process for Sensor 1 track 3 to complete the full association hypothesis. This process repeats for each iteration of each seed track pair on the list until the exit criteria is met.

Once the sampling loop exits, as shown in FIGS. 5a and 5b the probabilistic sampler converts the likelihoods of each of the saved full association hypothesis to probabilities, outputs the K most likely full association hypotheses 350 and computes and outputs a soft association matrix 352 based on all of the saved full association hypotheses. Because the sampler is approximating the continuous probability density function of the full solution space by sampling and calculating the likelihood of discrete points on the solution surface, the calculations are performed in log-likelihood space. At the conclusion of the sampling step, the log-likelihood values are normalized and exponentiated, converting them into probability space, and providing an estimate of the true probability density function.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A probabilistic sampling method, comprising:
from each of a first sensor and a second sensor, detecting a plurality of targets N and generating m and n track state estimates and covariance matrices for each sensor's detected subset of N targets, respectively, each said first and second sensor characterized by a respective bias covariance,
generating a probabilistic track association between the first and second sensor's m and n tracks including,
for each of a plurality of seed track pairs representing different track-to-track assignments between the first and second sensors,
initializing a full association hypothesis to include the seed track pair,
for each second sensor track, updating a marginal association likelihood conditioned upon existing track assignments and marginalized over possible sensor biases and sampling the marginal association likelihood to pair a different first sensor track with each said second sensor track to build the full association hypothesis, and
repeating the initialization and sampling a plurality of times to build different full association hypotheses for the seed track pair,
outputting a plurality of likely full association hypotheses with a posterior probability and a relative bias estimate for each full association hypothesis and a soft association matrix dimensioned in (i,j) representing the probability that track i from the first sensor is paired with track j from the second sensor,
fusing the first and second sensors' track state estimates using the soft association matrix and the plurality of full association hypotheses, and
using the fused track state estimates to make an engagement decision to act on one or more of the N targets.

2. The method of claim 1, further comprising pre-computing a plurality of terms prior to generating the probabilistic track association including for each (i,j) track pair computing:
a delta track state estimate $x_{i,j} = \widehat{x_{l_1}} - \widehat{x_{j_2}}$, $\widehat{x_{l_m}}$ is the lth track state estimate from the mth sensor,
a joint covariance matrix $S_{ij} = \overline{cov_{l_1}} + \overline{cov_{j_2}}$, where $\overline{cov_{l_m}}$ is the lth track state covariance matrix from the mth sensor,
an inverse joint covariance matrix $S_{i,j}^{-1}$,
a determinant of the joint covariance matrix $|S_{i,j}|$,
a Mahalanobis distance $x_{i,j}^T S_{i,j}^{-1} x_{i,j}$, and
a covariance weighted track state $S_{i,j}^{-1} x_{i,j}$.

3. The method of claim 2, wherein updating the marginal association likelihood after a track state pair is sampled to build the full association hypothesis comprises adding or subtracting the plurality of said terms in accordance with the following equations:

$$L_M(H \mid \mathcal{Z}) = (\beta_{NTA}\beta_{NTB})^{l^0}(\beta_T P_{AB})^l * \frac{\sqrt{2\pi^2|V|}}{\sqrt{\prod_{i,j \in H^+} 2\pi^2|S_{i,j}|}} e^{-\frac{\zeta}{2}}$$

$$V = \left(\sum_{i,j \in H^+} S_{i,j}^{-1}\right)^{-1}$$

$$\zeta = \left(\sum_{i,j \in H^+} x_{i,j}^T S_{i,j}^{-1} x_{i,j}\right) - u^T V u$$

$$u = \sum_{i,j \in H^+} S_{i,j}^{-1} x_{i,j}$$

Where the variables above, represent
- R=[D, D] bias covariance matrix, where D is the number of dimensions of the metric state information provided by the first and second sensors
- $\beta_{NT1}=\beta_T P_{T2}+\beta_{FA2}$=false target density for the second sensor
- $\beta_{NT2}=\beta_T P_{1\bar{2}}+\beta_{FA1}$=false target density for the first sensor
- $P_{T\bar{2}}=(1-P_1)P_2$ represents probability of not detecting a track on the first sensor while detecting the track on the second sensor
- $P_{1\bar{2}}=P_1(1-P_2)$ represents probability of not detecting a track on the second sensor while detecting the track on the first sensor
- $\beta_{FA1}$, $\beta_{FA2}$ represent the false track densities for the first and second sensors, respectively,
- $\beta_T$ is the target density per the n-dimensional state space volume, $$\frac{\hat{\eta}}{V}.$$

4. The method of claim 1, wherein said first and second sensors generate the m and n track state estimates based on metric features, further comprising said first and second sensors supplementing the m and n track state estimates with additional track state estimates based on non-metric features, wherein the marginal association likelihood is updated as a function of the track state estimates for both metric and non-metric features.

5. The method of claim 4, further comprising pre-computing a plurality of terms prior to generating the probabilistic track association including for each (i,j) track pair computing:
- a delta track state estimate $x_{i,j} = \widehat{x_{t_1}} - \widehat{x_{J_2}}$, $\widehat{x_{t_m}}$ is the lth track state estimate from the mth sensor,
- a joint covariance matrix $S_{ij} = \overline{cov_{l_1}} + \overline{cov_{J_2}}$, where $\overline{cov_{l_m}}$ is the lth track state covariance matrix from the mth sensor,
- an inverse joint covariance matrix $S_{i,j}^{-1}$,
- a determinant of the joint covariance matrix $|S_{i,j}|$,
- a Mahalanobis distance $x_{i,j}^T S_{i,j}^{-1} x_{i,j}$, and
- a covariance weighted track state $S_{i,j}^{-1} x_{i,j}$, and wherein updating the marginal association likelihood after a track state pair is sampled to build the full association hypothesis comprises adding or subtracting the plurality of said terms in accordance with the following equations:

$$L(H \mid \mathcal{Z}) = \prod_{(i,0) \in H} \beta_{NT2} \prod_{(0,j) \in H} \beta_{NT1} *$$

$$\prod_{(i,j) \in H} \beta_T P_{12} \frac{\sqrt{2\pi^2|V|}}{\sqrt{\prod_{i,j \in H^+} 2\pi^2|S_{i,j}|}} e^{-\frac{\zeta}{2}} \prod_{(i,j) \in H} featureWeight_{i,j}$$

$$V = \left(\sum_{i,j \in H^+} S_{i,j}^{-1}\right)^{-1}$$

$$\zeta = \left(\sum_{i,j \in H^+} x_{i,j}^T S_{i,j}^{-1} x_{i,j}\right) - u^T V u$$

$$u = \sum_{i,j \in H^+} S_{i,j}^{-1} x_{i,j}$$

Where the variables above, represent
- R=[D, D] bias covariance matrix, where D is the number of dimensions of the metric state information provided by the first and second sensors
- $\beta_{NT1}=\beta_T P_{T2}+\beta_{FA2}$=false target density for the second sensor
- $\beta_{NT2}=\beta_T P_{1\bar{2}}+\beta_{FA1}$=false target density for the first sensor
- $P_{T\bar{2}}=(1-P_1)P_2$ represents probability of not detecting a track on the first sensor while detecting the track on the second sensor
- $P_{1\bar{2}}=P_1(1-P_2)$ represents probability of not detecting a track on the second sensor while detecting the track on the first sensor
- $\beta_{FA1}$, $\beta_{FA2}$ represent the false track densities for the first and second sensors, respectively,
- $\beta_T$ is the target density per the n-dimensional state space volume, $$\frac{\hat{\eta}}{V},$$

and
where featureWeight$_{i,j}$=Combined feature weight for association i,j.

6. The method of claim 1, wherein for a given seed track pair, after the initial sampling to build the full association hypotheses, that full association hypotheses is used to initialize the full association hypotheses for the next sampling.

7. The method of claim 1, wherein for a given seed track pair, initializing the full association hypotheses includes only that seed track pair for each sampling.

8. The method of claim 1, further comprising only saving unique full association hypotheses that are more likely than or lie within a likelihood multiplier L of the current most likely full association hypothesis, outputting a plurality K of the most likely full association hypotheses saved and the soft association matrix computed from all saved full association hypotheses.

9. The method of claim 1, further comprising:
sorting a list of seed track pairs in decreasing order of likelihood and sampling the next seed track on the list;

saving only full association hypotheses that are both unique and either more likely than or lie within L times of a current most likely full association hypothesis, and terminating sampling before the list of seed track pairs is exhausted if no full association hypotheses are saved from sampling any of the last Y seed pairs from the list.

10. The method of claim 9, wherein the list of seed track pairs is sorted in accordance with one or more factors selected from a joint track pair feature compatibility, a relative frequency of track pair bias shift and a track pair bias shift compatibility with the sensor bias covariance matrix.

11. The method of claim 1, wherein only the most likely full association hypothesis is used to fuse the track state estimates.

12. The method of claim 1, wherein a plurality of likely full association hypotheses and the soft association matrix are used to fuse the track state estimates and generate a plurality of fusion hypotheses.

13. The method of claim 1, wherein said targets are incoming threats and said first and second sensors are configured to make radar, lidar, or optical observations of the incoming threats, wherein the fused track state estimates are used to generate cues to track the incoming threats or to launch counter measures to defeat the incoming threats.

14. The method of claim 1, wherein said first and second sensors are mounted on an autonomous vehicle and configured to make radar, lidar, or optical observations of targets in an environment around the autonomous vehicle to provide situational awareness, wherein the fused track state estimates are used to operate the autonomous vehicle to avoid or interact with said targets.

15. The method of claim 1, wherein said targets are packages on an automated line and said first and second sensors are configured to make radar, lidar, or optical observations of the products, wherein the fused track state estimates are used to accept or reject products and to make routing decisions for said products.

16. A probabilistic sampling method, comprising
from each of a first sensor and a second sensor, detecting a plurality of targets N and generating m and n track state estimates and covariance matrices for each sensor's detected subset of the N targets, respectively, each said first and second sensor characterized by a respective bias covariance,
generating a probabilistic track association between the first and second sensor's m and n tracks including,
sorting a list of seed track pairs representing different track-to-track assignments between the first and second sensors in decreasing order of likelihood;
for a next seed track pair on the list;
initializing a full association hypothesis to include the seed track pair,
for each second sensor track, updating a marginal association likelihood conditioned upon existing track assignments and marginalized over possible sensor biases and sampling the marginal association likelihood to pair a different first sensor track with each second sensor track to build the full association hypothesis,
saving only full association hypotheses that are both unique and either more likely than or lie within L times of a most likely full association hypothesis,
repeating the initialization and sampling a plurality of times X to build different full association hypotheses for the seed track pair, and
terminating sampling before the list of seed track pairs is exhausted if no full association hypotheses are saved from sampling any of the last Y seed pairs from the list,
outputting a plurality K of the most likely full association hypotheses with a posterior probability and a relative bias estimate for each full association hypothesis and a soft association matrix dimensioned in (i,j) representing the probability that track i from the first sensor is paired with track j from the second sensor,
fusing the first and second sensors' track state estimates using the soft association matrix and the plurality of full association hypotheses, and
using the fused track state estimates to make an engagement decision to act on one or more of the N targets.

17. The method of claim 16, wherein the list of seed track pairs is sorted in accordance with one or more factors selected from a joint track pair feature compatibility, a relative frequency of track pair bias shift and a track pair bias shift compatibility with the sensor bias covariance matrix.

18. A probabilistic sampler, comprising:
first sensor and a second sensors selected from radar, lidar, visible band or IR band and configured to detect a plurality of targets N and generate m and n track state estimates and covariance matrices for the N targets, respectively, each said first and second sensor characterized by a respective bias covariance,
a processor,
a memory, wherein the memory has stored thereon instructions that, when executed by the processor, cause the processor to generate a probabilistic track association between the first and second sensor's m and n tracks by,
for each of a plurality of seed track pairs representing different track-to-track assignments between the first and second sensors,
initializing a full association hypothesis to include the seed track pair,
for each second sensor track, updating a marginal association likelihood conditioned upon existing track assignments and marginalized over possible sensor biases and sampling the marginal association likelihood to pair a different first sensor track with each said second sensor track to build the full association hypothesis, and
repeating the initialization and sampling a plurality of times to build different full association hypotheses for the seed track pair,
outputting a plurality of the most likely full association hypotheses with a posterior probability and a relative bias estimate for each full association hypothesis and a soft association matrix dimensioned in (i,j) representing the probability that track i from the first sensor is paired with track j from the second sensor, and
a computer-implemented fuser configured to fuse the first and second sensors' track state estimates using the soft association matrix and the plurality of full association hypotheses to provide one or more fusion hypotheses.

19. The probabilistic sampler of claim 18, wherein the instructions cause the processor to:
sort a list of seed track pairs in decreasing order of likelihood and sampling the next seed track on the list;

save only full association hypotheses that are both unique and within L times of a current most likely full association hypothesis, and terminate sampling before the list of seed track pairs is exhausted if no full association hypotheses are saved from sampling any of the last Y seed pairs from the list.

* * * * *

UNITED STATES PATENT AND TRADEMARK OFFICE
CERTIFICATE OF CORRECTION

PATENT NO. : 11,301,731 B2
APPLICATION NO. : 16/133294
DATED : April 12, 2022
INVENTOR(S) : Ream et al.

It is certified that error appears in the above-identified patent and that said Letters Patent is hereby corrected as shown below:

In the Specification

In Column 6, Lines 55-56, delete "$\int_{b\in \mathbb{R}} \partial L(H,b|\mathbf{Z})db = L(H|\mathbf{Z})$," and insert $$\int_{b\in \mathbb{R}^D} L(H,b|Z)\,db = L(H|Z)$$

-- therefor

In Column 6, Line 63, after "ambiguity", insert --.--

In Column 9, Line 41, delete "$\beta_{NT2} = \beta_T P_{\overline{12}} + \beta_{FA1}$," and insert $$\beta_{NT2} = \beta_T P_{1\overline{2}} + \beta_{FA1}$$

-- therefor

In Column 9, Line 58, after "reported", insert --.--

In Column 10, Line 8, delete "ij." and insert --*i,j*-- therefor

In Column 12, Line 52, delete "0.501.50" and insert --.50/.50-- therefor

In the Claims

In Column 17, Line 40, in Claim 16, after "comprising", insert --:--

Signed and Sealed this
Thirteenth Day of December, 2022

*Katherine Kelly Vidal*
*Director of the United States Patent and Trademark Office*